United States Patent
Aufrichtig et al.

(10) Patent No.: US 6,393,097 B1
(45) Date of Patent: May 21, 2002

(54) DIGITAL DETECTOR METHOD FOR DUAL ENERGY IMAGING

(75) Inventors: Richard Aufrichtig, Mountain View, CA (US); Harrie Netel, Delafield, WI (US); Paul R. Granfors; Gerhard Brunst, both of Sunnyvale, CA (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/747,864

(22) Filed: Dec. 22, 2000

(51) Int. Cl.⁷ .................................. G01T 1/20
(52) U.S. Cl. ............. 378/98.11; 378/98.8; 378/98.9; 250/370.09
(58) Field of Search .............. 378/98.8, 98.9, 378/98.11, 207; 250/370.08, 370.09, 208.1

(56) References Cited

U.S. PATENT DOCUMENTS 5,452,338 A  * 9/1995 Granfors et al. ......... 378/98.11
5,841,833 A  * 11/1998 Mazess et al. ............. 378/98.9
6,115,451 A  * 9/2000 Boudry et al. ............. 378/98.8

* cited by examiner

Primary Examiner—David P. Porta
Assistant Examiner—Therese Barber

(57) ABSTRACT

A method for minimizing motion artifacts in Dual Energy Subtraction digital radiographic imaging applications by minimizing the time lapse between the two x-ray exposure frames. This is accomplished by acquiring the two x-ray exposure frames relatively consecutively without a corresponding offset frame reading in-between the two x-ray frame exposures. Preferably, the offset frames are acquired following the x-ray exposure frames with a corresponding timing sequence which is correlated to the x-ray frame exposure and reading sequence. The method includes the steps of exposing a radiographic detector at a first energy level for a time period $t_1$; reading the radiographic detector to obtain a first exposure reading; exposing the radiographic detector at a second energy level for a time period $t_2$; reading the radiographic detector to obtain a second exposure reading; after a time period equal to $t_1$, reading the radiographic detector to obtain an offset reading; and subtracting the offset reading from the first and second exposure readings.

20 Claims, 2 Drawing Sheets

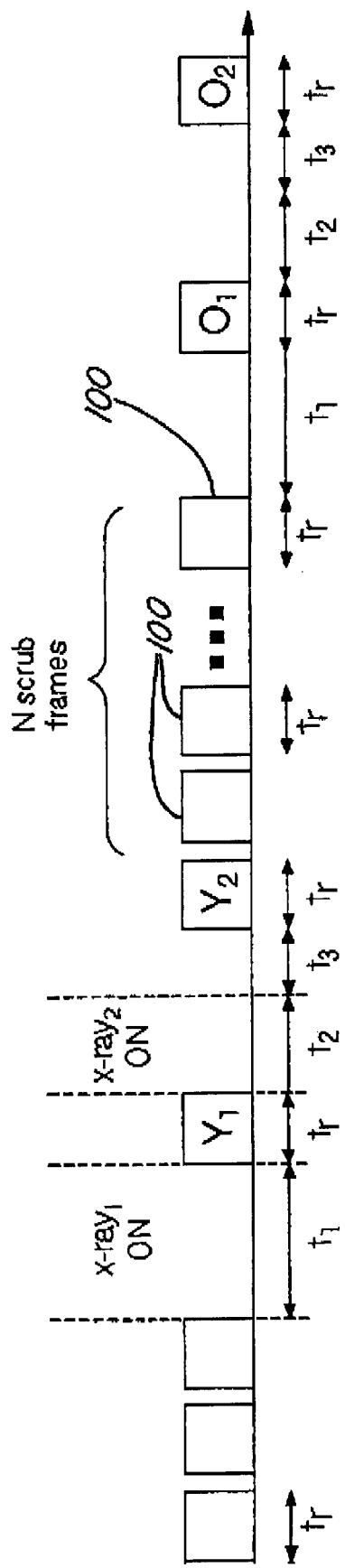

DIGITAL DETECTOR METHOD FOR DUAL ENERGY IMAGING

FIELD OF THE INVENTION

The present invention relates generally to x-ray imaging, and more specifically to methods for enhancing image quality in digital x-ray images for dual energy imaging.

BACKGROUND OF THE INVENTION

The classic radiograph or "x-ray" image is obtained by situating the object to be imaged between an x-ray emitter and an x-ray detector made of photographic film. Emitted x-rays pass through the object to expose the film, and the degree of exposure at the various points on the film are largely determined by the density of the object along the path of the x-rays.

It is now common to utilize solid-state digital x-ray detectors which comprise an array of switching elements and photosensitive elements such as photodiodes in place of film detectors. The charge is generated by the x-rays impinging on the various points of the detector array and are read and processed to generate a digital image of the object in electronic form, rather than an analog image on photographic film. Digital imaging is advantageous because the image can later be electronically transmitted to other locations, subjected to diagnostic algorithms to determine properties of the imaged object, stored, and so on.

During the digital imaging process, the image is generally not produced directly from the detector reading. Instead, the detector reading is processed to produce a cleaner image. In particular, the image is usually processed to eliminate the "offset," which is the image which would be obtained in the absence of exposure. The offset is determined by the detector leakage current, temperature, background radiation and a variety of other factors. The offset is desirably eliminated from the detector reading to provide better image quality. One method of capturing an image and subtracting its corresponding offset is disclosed in U.S. Pat. No. 6,115,451 entitled "Artifact Elimination In Digital Radiography" which is commonly assigned to the assignee of the present invention and is herein incorporated by reference.

Dual Energy Subtraction ("DES") is an important clinical application of digital x-rays imaging. DES consists of acquiring two x-ray images at different energies, and creating an output image by a combination of the two images. Using a solid-state digital x-ray detector, two acquisition frames are required; one image is acquired at a relatively high average x-ray energy, and the second image is acquired at a lower average x-ray energy. The time between the two image acquisitions is used to modify the x-ray energy. To minimize motion artifacts from respiration, heart motion, or other physiological motion, it is desirable to minimize the time duration between the two x-ray exposures. In addition, radiographic imaging with a digital detector requires the subtraction of an offset frame with similar acquisition timing as the x-ray frame.

Thus, there exists a need for a robust method of acquiring digital radiographs for Dual Energy Subtraction applications which includes a method for acquiring the corresponding effect and x-ray images.

SUMMARY OF THE INVENTION

It is an object of the present invention to provide an improved methodology for digital radiographic imaging in Dual Energy Subtraction applications. It is also an object of the present invention to provide a method for minimizing motion artifacts in Dual Energy Subtraction digital radiographic imaging applications.

The foregoing and other objects are provided by a method of radiographic imaging which minimizes the time lapse between the two x-ray exposure frames. This is accomplished by acquiring the two x-ray exposure frames relatively consecutively without a corresponding offset frame reading in-between the two x-ray frame exposures. Preferably, the offset frames are acquired following the x-ray exposure frames with a corresponding timing sequence which is correlated to the x-ray frame exposure and reading sequence. In preferred embodiments of the invention, the method includes the steps of exposing a radiographic detector at a first average energy level for a time period $t_1$; reading the radiographic detector to obtain a first exposure reading; exposing the radiographic detector at a second average energy level for a time period $t_2$; reading the radiographic detector to obtain a second exposure reading; after a time period equal to $t_1$, reading the radiographic detector to obtain an offset reading; and subtracting the offset reading from the first and second exposure readings.

In another embodiment of the present invention, first and second offset readings are taken in a timing sequence corresponding to the timing sequence of the first and second exposure readings to ensure that the conditions under which the offset readings are taken closely resemble the conditions under which the x-ray exposures were taking thereby minimizing artifact-related errors. In a preferred embodiment, the exposure time of the first x-ray is greater than the exposure time of the second x-ray and a delay period ($t_3$) is added prior to the second exposure reading to make the total time period prior to the second exposure reading ($t_2+t_3$) equal to the total time period prior to the first exposure reading ($t_1$). The offset readings are then taken after a similarly spaced timing sequence between the two offset readings. In another aspect of the invention, a single offset reading is subtracted from the first and second exposure readings. In another aspect of the invention, a plurality of offset readings are taken, and the average of the offset readings is subtracted from the first and second exposure readings.

Other objects and advantages of the invention will become apparent upon reading the following detailed description and appended claims, and upon reference of the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In The Drawings:

FIG. 2 is a plot illustrating an exemplary imaging scheme of the present invention as it occurs over time.

DESCRIPTION OF THE PREFERRED EMBODIMENT(S)

Figure 1:
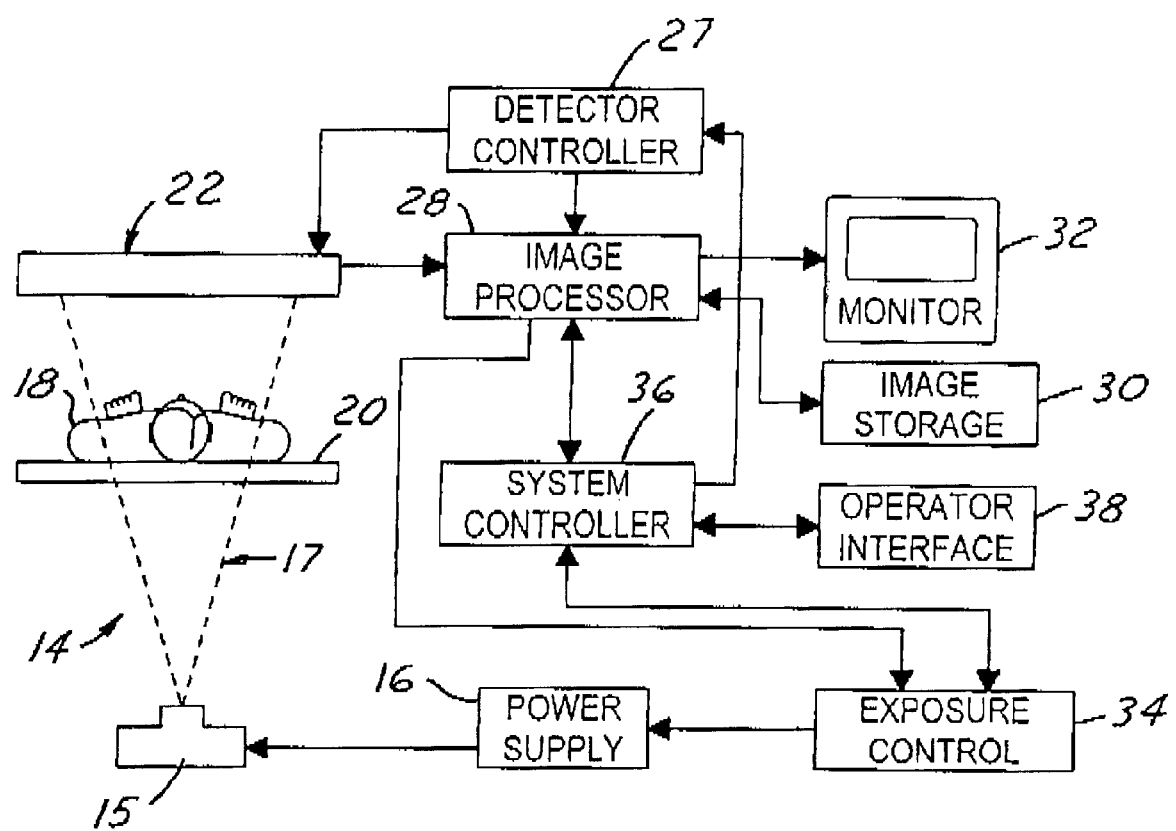
FIG. 1 is a schematic diagram of a radiographic imaging system in which the present invention can be utilized.

FIG. 1 schematically illustrates a representative x-ray system in which the present invention can be utilized. With reference to FIG. 1, an x-ray apparatus 14 includes an x-ray tube 15, which, when excited by a power supply 16, emits an x-ray beam 17. As illustrated, the x-ray beam is directed toward a patient lying on an x-ray transmissive table 20. A portion of the beam which is transmitted to the table and the patient impinges upon an x-ray detector designated 22.

The x-ray detector comprises a solid state image sensor formed by a two-dimensional array of photo detectors arranged in columns and rows. Several thousand photo detectors are positioned in each column and row connected to a common output line. A scintillator absorbs x-ray photons and converts them to light. Low noise photodiode array absorbs light and converts it into an electronic charge. Each photodiode represents a pixel or picture element. The electrical charge at each pixel is read out by low-noise electronics and turned into digital data sent to an image processor 28. The image processor includes circuitry for processing and enhancing the x-ray image signal. The processed image is then typically displayed on a video monitor 32 and may be archived in an image storage device 30. The image processor 28 also typically produces a brightness control signal which is applied to an exposure control circuit 34 to regulate the power supply 16 and therefore the x-ray exposure.

The overall operation of the x-ray apparatus 14 is governed by a system controller 36 which receives commands from the x-ray technician through an operator interface panel 38.

Referring now to FIG. 2, there is shown a plot illustrating an exemplary imaging scheme of the present invention as it occurs over time. As mentioned above, to perform DES with a digital detector system, it is necessary to acquire two x-ray frames, and at least one offset frame corresponding to the x-ray frames. The present imaging scheme minimizes time between the acquisition of the two x-ray frames to thereby minimize motion artifacts. The offset frame or frames are then later acquired with an appropriate timing sequence. For the exemplary scenario shown in FIG. 2, it is assumed that the x-ray On times are unknown prior to the exposure, and are controlled by an automatic exposure control sensor which is part of the system shown in FIG. 1.

In the timing diagram of FIG. 1, the symbols are defined as follows:

$t_r$=detector read-out time $t_1$=time for first x-ray exposure $t_2$=time for second x-ray exposure $t_3$=latch time $Y_1$=image of first x-ray exposure $Y_2$=image of second x-ray exposure $O_1$=image of first offset frame $O_2$=image of second offset frame N=a variable number of scrub frames In the exemplary imaging scenario, the two x-ray frames $Y_1$ and $Y_2$ are acquired followed by the offset frames $O_1$ and $O_2$. To minimize the time between the x-ray frames $Y_1$ and $Y_2$, the latch time $t_3$ can be set equal to zero. In such a case, if $t_1$ and $t_2$ are not equal, both offset frames $O_1$ and $O_2$ will be required in a timing sequence identical to the timing sequence of the x-ray frame capture. Thus, after a time period $t_1$, there is a detector read-out time $t_r$ to acquire $Y_1$ followed by a time period $t_2$ and a read-out time period $t_r$ to acquire $Y_2$ followed by a time period $t_1$ and a read-out time period $t_r$ to acquire $O_1$, followed by a time period $t_2$ and a read-out time period $t_r$ to acquire $O_2$. The energy subtracted image would thus be calculated as follows:

$$X=f(Y_1-O_1, Y_2-O_2) \quad (1)$$

Wherein the function describing the DES imaging is derived by known methods.

Typically, the exposure time for the low average energy exposure $Y_1$ is longer than the exposure time for the high average energy exposure $Y_2$. Thus, to further minimize the time between the two x-ray exposures, it is preferable that the low energy exposure $Y_1$ be acquired first. The acquisition of the second offset frame $O_2$ can be eliminated thereby reducing the contribution of electronic noise if a latch time $t_3$ is used between $t_2$ and the read-out time $t_r$ for the image of the second x-ray exposure $Y_2$. In such a case, the latch time $t_3$ is defined as the difference between $t_1$ and $t_2$ so that total time $t_2+t_3$ is equal to $t_1$. Thus, in this case, the DES image is calculated as:

$$X=f(Y_1-O_1, Y_2-O_1) \quad (2)$$

The latch time $t_3$ can also be used with fixed-time x-ray exposures, again, if the fixed exposure times $t_1$ and $t_2$ are unequal. Furthermore, if fixed-time x-ray exposures are utilized, the offset frame or frames $O_1$ and $O_2$ can be taken either before or after the two x-ray exposures $Y_1$ and $Y_2$ because the time periods $t_1$, $t_2$ and, if necessary, $t_3$ are known.

To minimize the potential image artifact caused by timing changes, several scrub frames 100 can be used so that the offset timing sequence matches the x-ray timing sequence. Typically, the number of scrub frames is equal to four. A scrub frame is an offset readout that is discarded. A method of determining the appropriate number of scrub frames is disclosed in U.S. Pat. No. 6,115,451 which is herein incorporated by reference.

If additional computation time to display the DES image is available, a further reduction of electronic noise can be obtained by acquiring multiple offset frames following the timing scenario specified after the $Y_2$ frame acquisition as shown in FIG. 2. Thus, for example, assuming no scrub frames are used (N=0) and $t_1$ is equal to $t_2$ or a latch time $t_3$ is used, then an exemplary scenario for acquiring multiple offset frames to be averaged would be as follows: delay for a time period $t_1$, readout the first offset frame $O_1$, delay for a time period $t_1$, readout the second offset frame $O_2$, and so on through the readout of offset frame $O_M$ wherein M is equal to the number of offset frames to be averaged. The average of the offset frames is then used as the offset subtraction for $Y_1$ and $Y_2$.

From the foregoing, it can be seen that there has been brought to the art a new and improved digital detector method for dual energy imaging. The present radiographic imaging method minimizes the timing between the two x-ray frames required for DES imaging, thereby reducing motion artifacts. In addition, the method provides for time latching the x-ray exposure frames such that only a single offset frame capture is necessary. The invention is also advantageous in that the time to acquire the offset frames is reduced and therefore the time to process and display the DES image is reduced. The method also reduces the noise in the resulting image. While the invention has been described in connection with one or more embodiments, it should be understood that the invention is not limited to those embodiments. On the contrary, the invention covers all alternatives, modifications and equivalence as may be included within the spirit and scope of the appended claims.

What is claimed is:

1. A method of radiographic imaging comprising:

exposing a radiographic detector at a first x-ray energy level for a time period $t_1$;

reading the radiographic detector to obtain a first exposure reading;

exposing the radiographic detector at a second x-ray energy level for a time period $t_2$;

reading the radiographic detector to obtain a second exposure reading;

after a time period equal to $t_1$, reading the radiographic detector to obtain an offset reading; and subtracting the offset reading from the first and second exposure readings.

2. The method of claim 1 wherein $t_1$ is equal to $t_2$.

3. The method of claim 1 wherein $t_1$ is greater than $t_2$.

4. The method of claim 3 further comprising delaying a time period $t_3$ prior to the step of reading the radiographic detector to obtain a second exposure reading, and wherein $t_3$ is equal to $t_1-t_2$.

5. The method of claim 1 wherein the step of reading the radiographic detector to obtain an offset reading occurs after reading a plurality of scrub frames followed by a time period equal to $t_1$.

6. The method of claim 5 wherein the plurality of scrub frames is equal to four.

7. The method of claim 1 wherein the first x-ray energy level is less than the second x-ray energy level.

8. A method of radiographic imaging comprising:

exposing a radiographic detector at a first x-ray energy level for a time period $t_1$;

reading the radiographic detector to obtain a first exposure reading;

exposing the radiographic detector at a second x-ray energy level for a time period $t_2$;

reading the radiographic detector to obtain a second exposure reading;

after a time period equal to $t_1$, reading the radiographic detector to obtain a first offset reading corresponding to said first exposure reading;

after a time period equal to $t_2$, reading the radiographic detector to obtain a second offset reading corresponding to said second exposure reading;

subtracting the first offset reading from the first exposure reading; and subtracting the second offset reading from the second exposure reading.

9. The method of claim 8 wherein $t_1$ is equal to $t_2$.

10. The method of claim 8 wherein $t_1$ is greater than $t_2$, and wherein the step of reading the radiographic detector to obtain a second exposure reading occurs after a time period $t_3$, and wherein the step of reading the radiographic detector to obtain a second offset reading corresponding to said second exposure reading occurs after a time period equal to $t_2+t_3$, wherein $t_3$ is equal to $t_1-t_2$.

11. The method of claim 8 wherein the step of reading the radiographic detector to obtain a first offset reading occurs after reading a plurality of scrub frames followed by a time period equal to $t_1$.

12. The method of claim 11 wherein the plurality of scrub frames is equal to four.

13. The method of claim 8 wherein the first x-ray energy level is less than the second x-ray energy level.

14. A method of radiographic imaging comprising:

exposing a radiographic detector at a first x-ray energy level for a time period $t_1$;

reading the radiographic detector to obtain a first exposure reading;

exposing the radiographic detector at a second x-ray energy level for a time period $t_2$;

reading the radiographic detector to obtain a second exposure reading;

reading the radiographic detector M times to obtain a M offset readings;

averaging said M offset readings to obtain an average offset reading; and subtracting the average offset reading from the first and second exposure readings.

15. The method of claim 14 wherein $t_1$ is equal to $t_2$.

16. The method of claim 14 further comprising delaying a time period $t_3$ prior to the step of reading the radiographic detector to obtain a second exposure reading, and wherein $t_1$ is greater than $t_2$ and $t_3$ is equal to $t_1-t_2$.

17. The method of claim 14 wherein the step of reading the radiographic detector M times to obtain M offset readings occurs after a time period equal to $t_1$.

18. The method of claim 14 wherein the step of reading the radiographic detector M times to obtain M offset readings occurs after reading a plurality of scrub frames followed by a time period equal to $t_1$.

19. The method of claim 14 wherein the step of reading the radiographic detector M times to obtain M offset readings occurs after delaying a time period equal to $t_1$ prior to each reading.

20. The method of claim 14 wherein the first x-ray energy level is less than the second x-ray energy level.

* * * * *